US007484284B1

(12) United States Patent
Mason

(10) Patent No.: US 7,484,284 B1
(45) Date of Patent: Feb. 3, 2009

(54) HIGH PRESSURE WATER BLASTING DEVICE

(76) Inventor: George W. Mason, 121 N. Lafayette St., Mayesville, SC (US) 29104

( * ) Notice: Subject to any disclaimer, the term of this patent is extended or adjusted under 35 U.S.C. 154(b) by 390 days.

(21) Appl. No.: 11/521,721

(22) Filed: Sep. 15, 2006

(51) Int. Cl.
*B23P 19/04* (2006.01)

(52) U.S. Cl. .................... 29/243.55; 29/243.56; 269/95

(58) Field of Classification Search .............. 29/243.56, 29/281.1, 238; 269/95, 131
See application file for complete search history.

(56) References Cited

U.S. PATENT DOCUMENTS 4,187,563 A 2/1980 Semke
4,475,255 A 10/1984 Tash
4,521,140 A * 6/1985 Doescher et al. .............. 408/97
4,606,364 A 8/1986 Tash
4,868,965 A * 9/1989 Drymon ...................... 29/259
4,893,393 A * 1/1990 Marshall ...................... 29/237
5,052,608 A * 10/1991 McClure .................... 228/44.5
5,269,027 A 12/1993 Iatropoulos
6,415,491 B1 * 7/2002 Klann ......................... 29/259
6,886,228 B1 * 5/2005 Chen .......................... 29/263
7,168,693 B1 * 1/2007 Sjuts et al. .................... 269/37
7,328,501 B2 * 2/2008 Smiley et al. ................. 29/721

* cited by examiner

*Primary Examiner*—Lee D Wilson
(74) *Attorney, Agent, or Firm*—Lawrence J. Gibney, Jr.

(57) ABSTRACT

This device will allow a worker to safely, cleanly and most efficiently clean out a pipe or piping system, using high pressure fluid, probably water, that is directed through an opening and into the pipe. This device can be used on any piping system and may be adjusted so that it is secured to any device.

3 Claims, 5 Drawing Sheets

HIGH PRESSURE WATER BLASTING DEVICE

BACKGROUND OF THE INVENTION

A. Field of the Invention

This is a device to clear an obstruction in a pipe, particularly in the chemical or industrial sectors. If chemicals or petroleum products are transported by pipeline, a layer of sediment will form around the inner perimeter of the pipe, which will interfere with the flow in the pipe. This layer of sediment should be periodically cleaned in order to maintain maximum efficiency and to prevent obstruction of the flow in the pipe.

B. Prior Art

There are many other prior art references to methods and devices used to clean pipes and piping systems.

A representative example of this can be found at Semke, U.S. Pat. No. 4,187,563, which is a device for flushing the drainpipe of a sink. However, this device does not particularly relate to sinks and relates more so to flushing a pipe. Another example can be found at Tash, U.S. Pat. No. 4,475,255, which is a pipe-flushing device. However, this is not installed with the appropriate safety mechanisms that the current application employs.

BRIEF SUMMARY OF THE INVENTION

Sometimes it is necessary to clean or clear a pipe, particularly if those pipes are used to transport chemicals, petroleum products or even sewage. These types of fluids will form a layer of sludge or sediment around the inner perimeter of the pipe. This layer of sediment will obstruct the flow within the pipe and should be periodically cleaned.

These pipes are typically cleaned using a stream of high pressure water; the pressure of the water can be between twenty thousand and forty thousand pounds per square inch. A hose, which is capable of handling that type of pressure, is installed in the pipe opening, usually at a section of pipe, which is flanged and the stream of high pressure water is introduced.

If the high pressure hose is allowed to exit the pipe under that amount of pressure serious personal injury or even death may result from the end of the hose striking a worker. This device was conceived to address the problem of periodically cleaning the pipe while at the same time addressing the safety issue.

This device is designed to improve safety by preventing the hose end from exiting the pipe back towards the user. It is easy to install and fits on any size of pipe. The device is designed to be portable. The device is placed over the opening of the flange of the pipe and partially covers the opening.

The device is comprised of a piece of flat stock with two elliptical openings on the front. Within the elliptical openings are two locking pins. One end of each of the locking pins is inserted into the holes on the pipe flange that are used to secure the sections of pipe. The distance between the locking pins can be adjusted by a threaded rod.

A way to secure the locking pin to the stock is provided and a variety of means may be employed to include cable, rope or string; holes in the locking pins are provided to secure the locking pins to the flat stock.

In the center of the device will be an opening, which is inserted into the pipe opening. The center section of this opening may be equipped with a bushing to reduce the diameter of the hole depending on the diameter of the hose that will be used. The bushing like the opening would be hollow.

The hose is placed in the opening or through the bushing and the stream of high pressure water is forced into the pipe. When the device is installed the majority of the pipe opening will be covered. A certain portion of pipe opening will not be covered to allow the water to exit the piping, if needed, to prevent damage to the pipe itself and to prevent serious injury to the worker.

DETAILED DESCRIPTION OF THE EMBODIMENTS

This device 5 is used to clear industrial pipes. Cleaning a pipe may be difficult and should be done in a safe manner. This device is comprised of a long flat member with an opening in the center of the device and a pair of elliptical openings adjacent to the hole in the center. A high pressure hose is placed through this opening and water under a great deal of pressure is placed in the piping system to clean the pipe.

The diameter of the opening may be adjusted through the use of a bushing 12. The bushing is hollow through the center and the two sections, 16B and 16T, will be threaded. A hose is threaded through the opening 10 prior to the water being introduced into the piping. In the event that the hose moves backwards in the hole through the pipe opening this device would prevent that because the diameter of the opening would be slightly greater than the opening of the hose.

Figure 2:
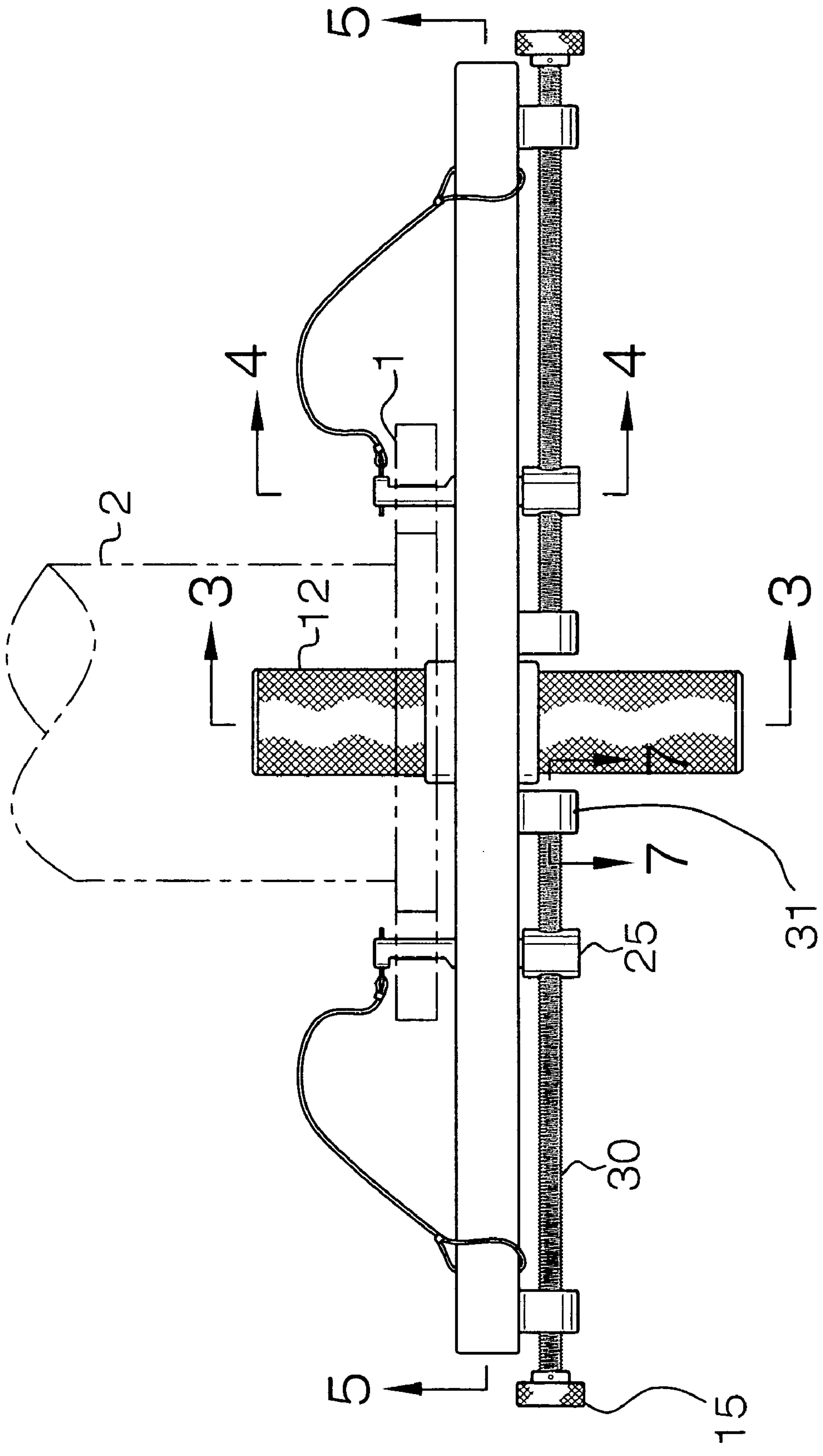
FIG. 2 is a top view of the device with a pipe shown in dashed lines.
Figure 4:
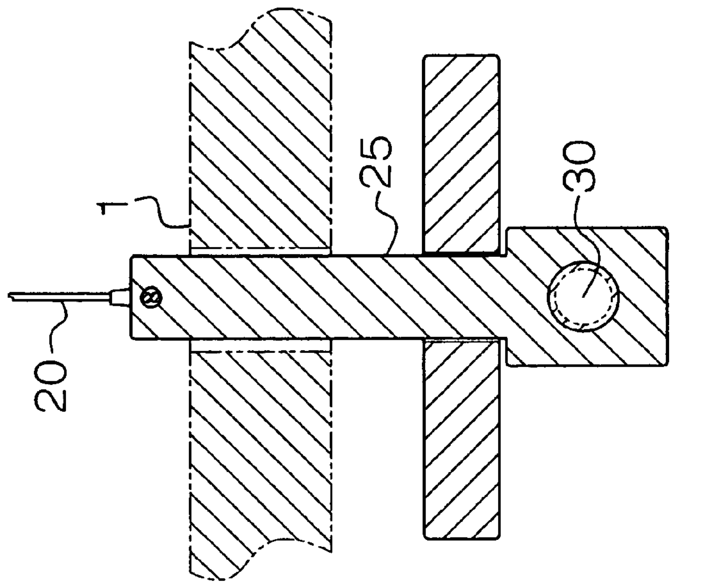
FIG. 4 is a view according to line 4-4 on FIG. 2.
Figure 3:
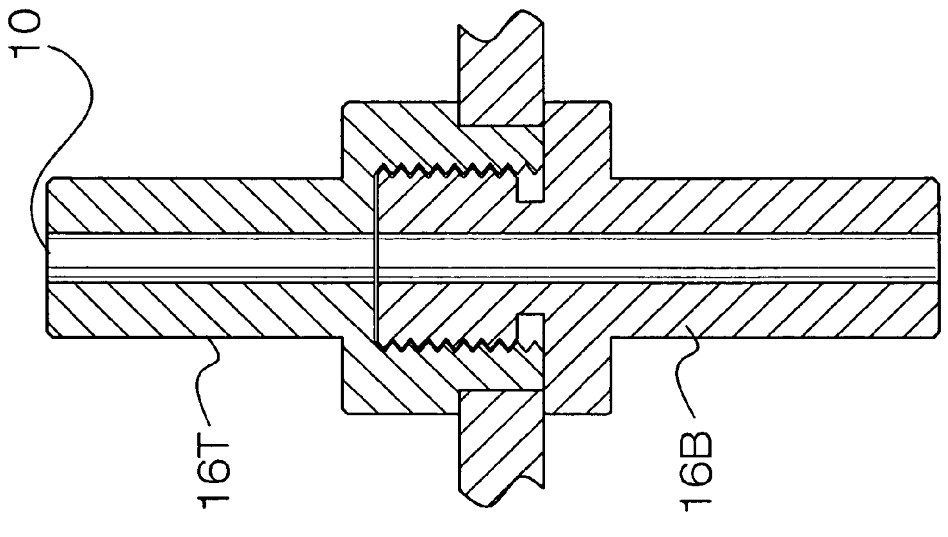
FIG. 3 is a view according to line 3-3 on FIG. 2.
Figure 5:
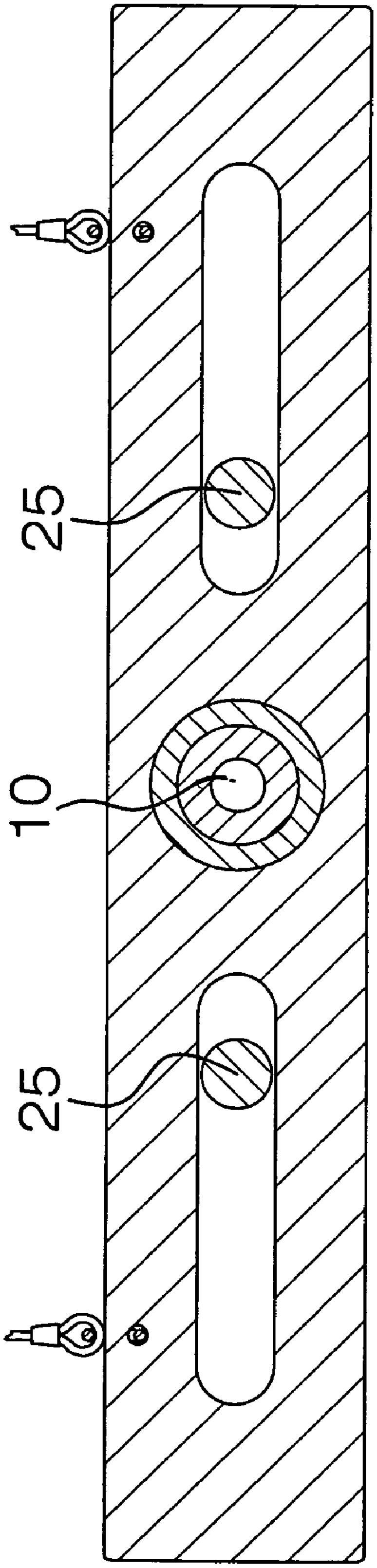
FIG. 5 is a view according to line 5-5 on FIG. 2.

This device is installed by separating the union of a section of pipe and installing the device on the pipe flange 1, using the existing holes for the bolts. FIG. 2 An adjustment mechanism, probably a threaded rod 30, is used to shift a set of locking pins 25, which is threaded to accommodate the threads on the threaded rod, to abut the outer surface of the pipe flange bolt holes and secure the device 5 in place. FIGS. 2,4

Figure 6:
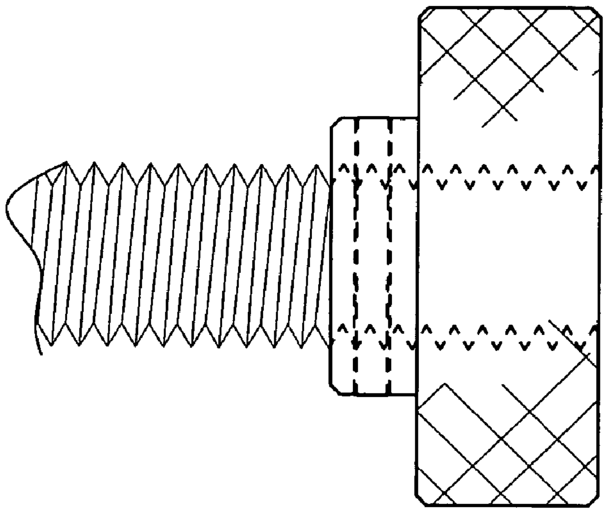
FIG. 6 is a fragmented front view of the means to secure the threaded rod to the device.
Figure 7:
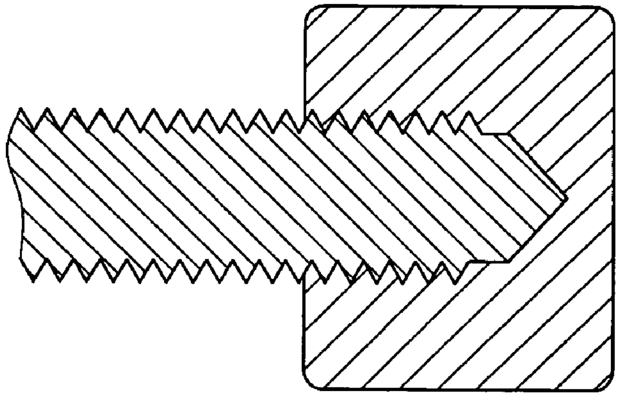
FIG. 7 is a view according to line 7-7 on FIG. 2.

The threaded rod 30 allows for the locking pins 25, which is threaded in order to accommodate the threaded rod to move within the elliptical openings for proper fit. On each end of the threaded rod 30 will be a handle 15 to make the appropriate adjustment to secure the device in the pipe flange. On the opposite end of the handle 15 will be means to secure 17 the threaded rod. This securement means is either internally threaded such as depicted in FIG. 7 or mounted using a threaded member such as depicted in FIG. 6. As the threaded rod turns it will remain stationary but allow the locking pin 25, which is threaded to accommodate the threaded rod to move within the elliptical opening.

Figure 1:
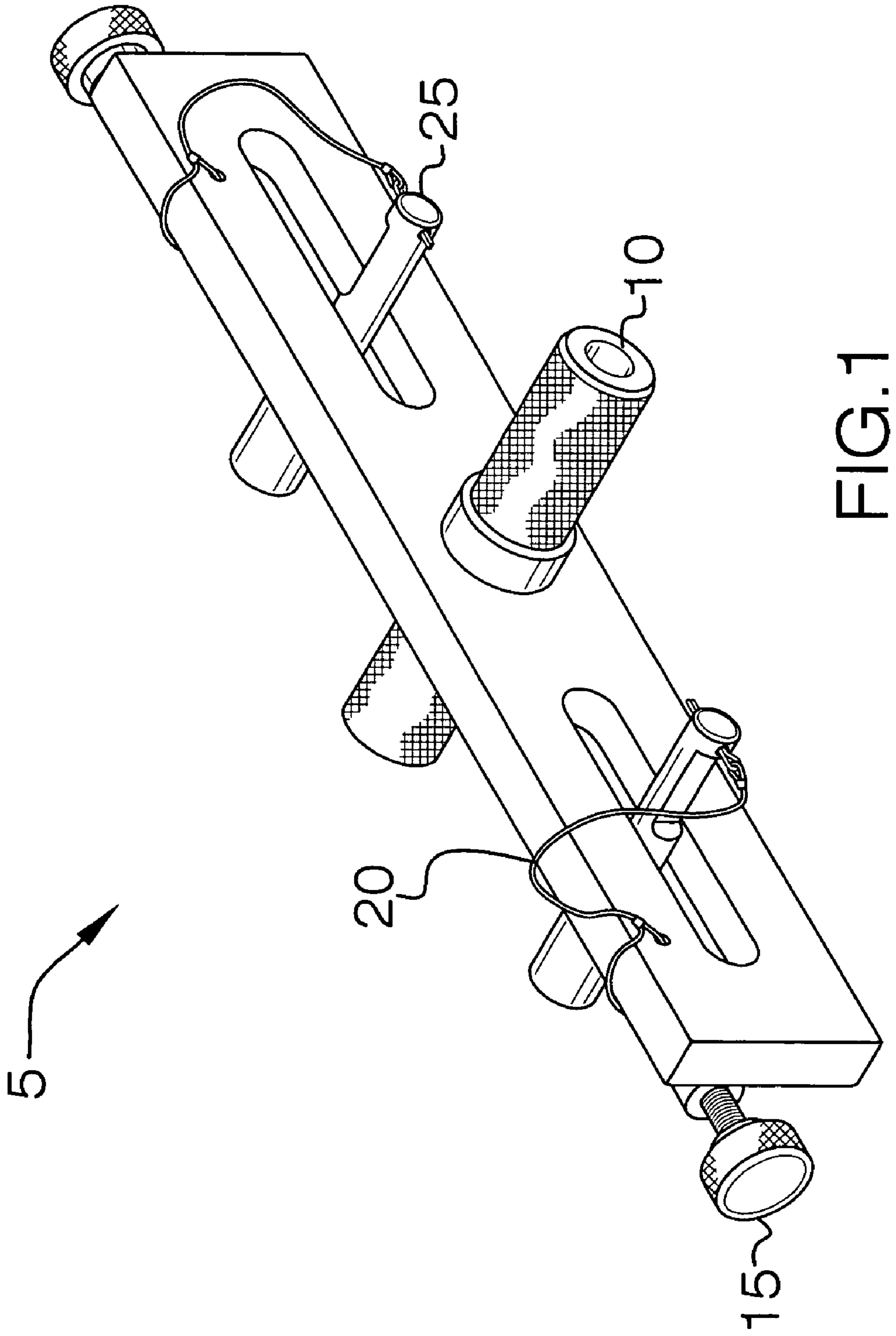
FIG. 1 is an isometric view of the device.

Elliptical openings are provided on the flat member to allow the locking pins to move along the length of the device. One surface of the locking pin is flanged to insure that the locking pin remains within the elliptical opening. FIG. 4 One end of the locking pin is slightly indented to better insure that the locking pin remains securely in place once it is placed in the flange bolt holes of the pipe. A safety strap 20 secures one end of the locking pin 25 to the device 5. FIGS. 1,4

Once the device is installed the hose is placed through the opening in the center 10 and the water is introduced into the piping.

When the device is installed the flange opening for the pipe is almost completely covered. If an excessive amount of pressure builds within the piping system due to the high pressure water stream, the portion of the piping that is open will allow the excess water to leave the piping system without damaging the piping system.

While the embodiments of the invention have been disclosed, certain modifications may be made by those skilled in the art to modify the invention without departing from the spirit of the invention.

The inventor claims;

1. A device to clean out piping, which is comprised of:

a. a flat member;

wherein the flat member has a predetermined shape;

wherein the flat member has two elliptical openings wherein an opening is provided in the center of the flat member;

b. locking pins;

wherein locking pins are inserted through the elliptical openings;

wherein locking pins are secured to the device using safety lines;

wherein the locking pins are secured to the device with threaded rods;

wherein one end of the locking pin is threaded internally to accommodate the threaded rod;

wherein a portion of the locking pins are placed in the flange holes of the pipe;

c. an opening;

wherein an opening in the center of the flat member provides a means to insert a hose into the piping system;

wherein the center diameter of the opening may be altered;

wherein a bushing is used to alter the diameter of the opening.

2. The device as described in claim 1 wherein one side of the locking pins are slightly indented to provide a mating surface for the pipe flange.

3. The device as describe in claim 1 wherein the bushing is further comprised of two sections;

wherein the two sections are threaded.

* * * * *